Patented Mar. 31, 1931

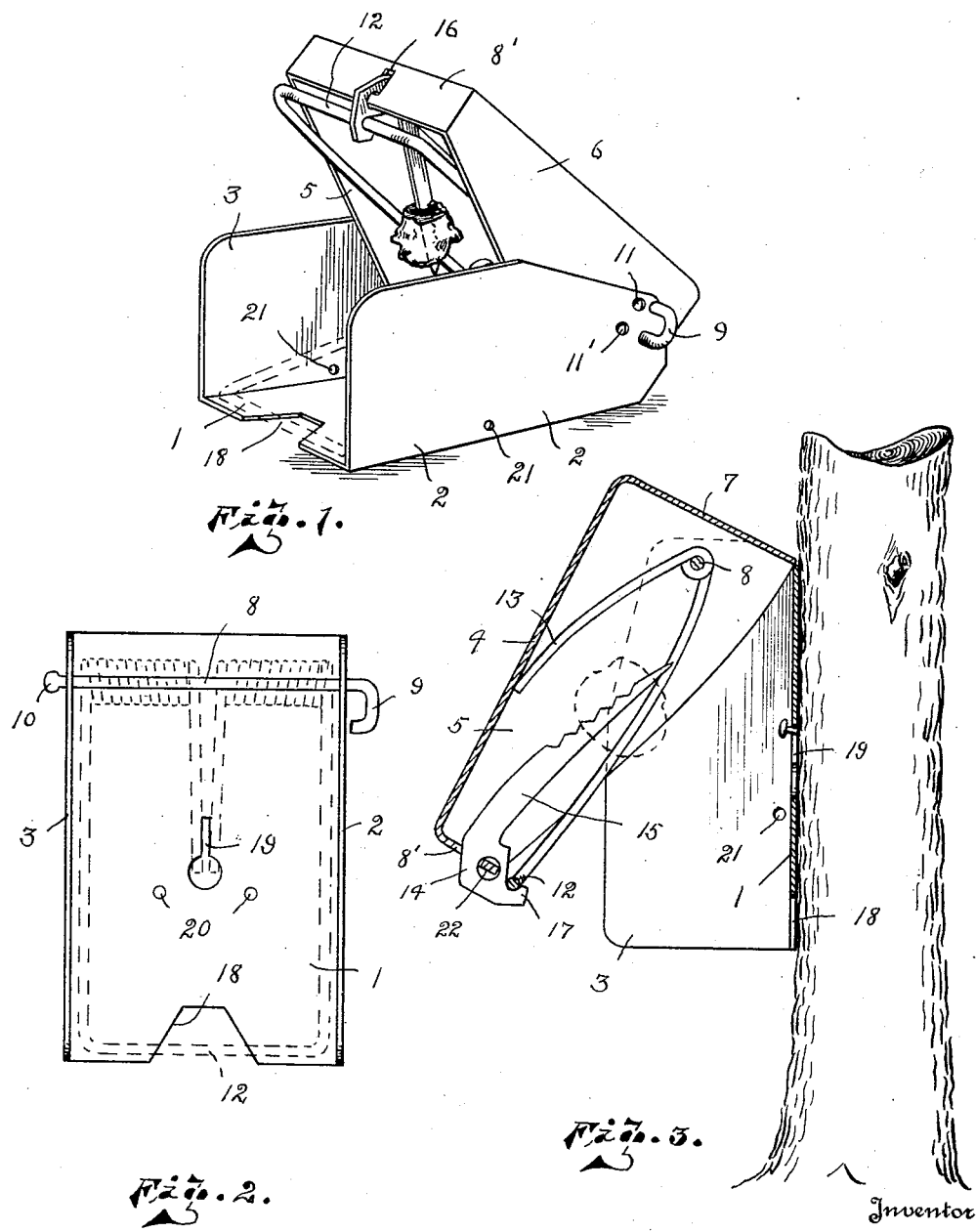

1,798,541

UNITED STATES PATENT OFFICE

JOHN KLEFFMAN, OF HIBBING, MINNESOTA

TRAP

Application filed January 12, 1929. Serial No. 332,163.

This invention relates to animal traps and to one particularly designed for the catching of small predatory animals such as weasels or the like.

The principal object is to provide a more simple and effective killing trap for this purpose.

Another object is to provide such a trap which may be suspended upon an upright object to necessitate an animal reaching upwardly for same thereby enticing it to put forth an effort in gaining the bait.

Another object is to provide convenient means whereby the trap may be carried either in set position or not and with the least danger resulting therefrom.

Still another object is that of providing simple means whereby the trap may be most conveniently set, and with a minimum of danger.

Further objects and advantages of the invention will appear in the following description thereof.

Referring now to the accompanying drawing, forming part of this application, and wherein like reference characters indicate like parts:

Figure 1 is a perspective view of the trap in set position when resting upon the ground;

Figure 2 is an elevation of the base member of the trap showing the inner surface thereof; and Figure 3 is a central cross sectional view of the trap as suspended from the trunk of a tree.

The trap is composed principally of two somewhat similarly shaped interfoldable sheet metal members, one of which I shall refer to as the base member and the other as the hood. The base member comprises the back 1 and opposite side walls 2 and 3, while the hood member comprises the front wall 4, side walls 5 and 6, and end walls 7 and 8'.

A through bolt or rod 8 is employed as a pivotal connection for the interfoldable members, it being mounted adjacent one end of the trap. This bolt also acts as a locking means for retaining the members in either their opened or closed relation to each other, and for which purpose one end thereof terminates in the staple like hook 9, and the opposite end formed with the head 10 thereupon for conveniently reciprocating same. Through the wall 2 of the base of the trap and suitably spaced from the hole through which the rod 8 extends and for registration with the free bent end of the hook 9 in the rod, is formed a hole 11, there being a similar hole formed in the wall 6 of the hood for registration therewith when the hood is in open position. There is also a hole 11' similarly spaced from the rod 8 but so positioned that when the free end of the hook 9 is forced therethrough with the hood in its closed position, the hook will register therewith for holding the members closed; such position of the members being particularly desirable when the trap is being transported or conveyed for example in the pocket of the trapper.

The rod 8 is further employed as a support for the spring member of the trap, this being of general U-shape and fitting readily within the hood of the trap with its foremost transverse catching portion or bar 12 parallel with the front edge of the wall 8' of the hood when set and slightly spaced therefrom, while the side members of the spring extend backwardly parallel and adjacent the side walls of the hood to and about the rod 8, they being helically wound thereabout and terminating adjacent the center thereof in the forwardly extending portions or termini 13 which bear forcibly against the inner face of the wall 4 of the hood; this force being, of course, that which controls the snapping effect of the trap, and, it will be noted, is wholly independent of either the opened or closed position of the base and hood.

Means for holding the swing of the trap in set position as shown in Figures 1 and 3 comprise the tripper or dog 14 mounted within the wall 8' of the hood and provided with the bait carrying prong 15 extending inwardly to substantially the centermost portion of the hood and upon which a bait may be readily fastened in any desired manner. The mounting of the dog 14 is accomplished by making a somewhat vertically elongated hole 16 in the wall 8' of the hood, the outermost boundary of which is cut either centrally or upon one side so that it may be bent for insertion of the dog until the hole registers therewith when it may be straightened again and act as a pivotal support 22 for the dog. As is obvious the lip 17 of the dog may be formed as desired for the delicate setting of the trap.

Attention is directed to the substantially V-shaped notch 18 formed centrally of the outermost edge of the back or floor member 1 of the base which is bridged by the bar 12 of the spring when the latter is snapped. It will be noted that when this state of the trap exists, and the latter is held in the hand, say in an upright position, such as shown in Figure 3, the prong of the dog will dangle down from the front end of the hood when the bait may be most conveniently attached, it extending out freely from any part of the trap. Then when the bait is applied, and the trap turned over for example on its back, with the prong inwardly thereof where it belongs, and the hood brought forcibly upwardly into closed position, the lip of the dog will automatically engage the bar of the spring and thus become hooked in a most convenient and satisfactory manner; there only remaining for the setting of the trap the raising of the hood, with the spring thus engaged, to the position shown in Figures 1 and 3 of the drawings.

In the back or floor 1 of the base of the trap I have illustrated a key hole shaped slot 19 for conveniently hooking the trap in upright position, as shown in Figure 3, upon a nail previously driven into a tree or other convenient upright for supporting the trap. I have also illustrated additional holes 20 through which a tying wire or other fastening means may be attached to for example a twig or bush, impractical for the application of a nail. There are also shown holes 21 through the side walls of the base of the trap through which a wire may be employed in tying the trap about a metal post for example or a tree when a nail is not available.

Another and major advantage of this form of trap resides in its novel construction when employed in an upright position as shown in Figure 3, especially for winter use wherein it is quite obvious that the trap may not be affected in any manner whatever by being covered with snow, and furthermore the trap when thus set is free from any predatory effect in respect to birds or larger animals which might otherwise spring the trap or become hurt thereby.

From the foregoing it is evident that I have devised an exceedingly simple and practical hooded trap, free from obstruction by snow, one not liable to attract or catch creatures not intended to be caught, and one in which the animal caught will invariably be instantly killed, as in snapping the trap it will be obliged to enter well thereinto to reach the bait. Furthermore the trigger carrying the bait may be set to any degree of nicety, so that the least downward draft thereupon will spring the trap.

Having thus described my invention, what I claim and desire to secure by Letters Patent, is:

1. An animal trap comprising two semi-box-like interfoldable members, means for pivotally uniting said members adjacent one end thereof, a one piece spring catching member carried upon said pivotal means, and means whereby said pivot selectively acts as a lock for holding the members either open or closed.

2. A trap of the type described comprising two foldable semi-box-like sections, a spring operated killing bar carried within the sections, and selective locking means for locking the parts either opened or closed when set or not.

In testimony whereof I affix my signature.

JOHN KLEFFMAN.